April 1, 1930.  J. D. PURDY  1,752,929
LOCOMOTIVE VALVE GEAR
Filed June 13, 1929  2 Sheets-Sheet 1

Inventor
Jay D. Purdy
By Owen & Owen
Attorneys

Patented Apr. 1, 1930

1,752,929

UNITED STATES PATENT OFFICE

JAY D. PURDY, OF SWANTON, OHIO, ASSIGNOR TO THE PILLIOD COMPANY, OF SWANTON, OHIO, A CORPORATION OF OHIO

LOCOMOTIVE VALVE GEAR

Application filed June 13, 1929. Serial No. 370,542.

This invention relates to locomotive valve gears, but more particularly to that type of gear commonly referred to as the "Baker" gear, and an object is to improve the construction by strengthening certain of the parts and facilitating the assembly thereof.

Figure 1:
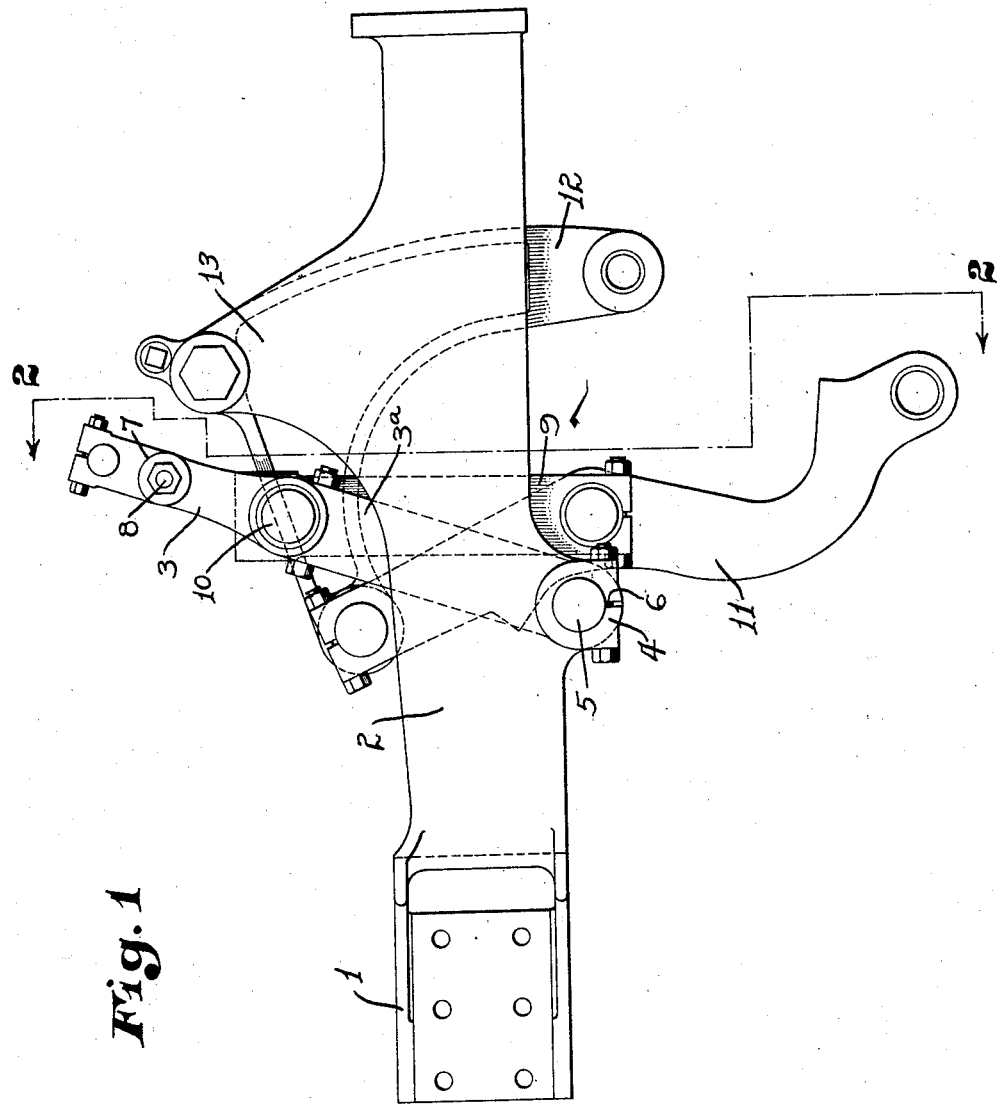
Figure 2:
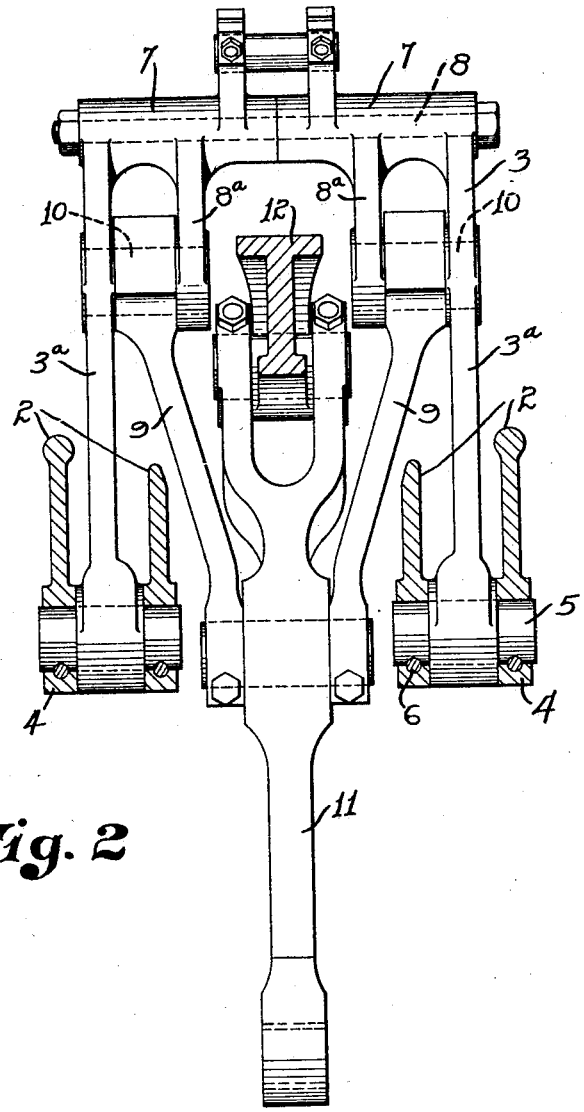

Other objects will hereinafter appear, and the invention is shown by way of illustration in the accompanying drawings, in which:

Fig. 1 is a side elevation of the gear frame with the reverse yoke, bell crank and associated parts mounted thereon; and Fig. 2 is a transverse sectional elevation on the line 2—2 of Fig. 1.

The illustrated embodiment of the invention comprises a frame 1 of a locomotive valve gear of the so-called "Baker" type. As shown, the gear frame is made up of two pairs of side bars 2 forming an integral part of the frame which may be rigidly fixed in any suitable manner to the locomotive structure. Each pair of side bars 2 are spaced apart laterally to receive therebetween one arm 3ᵃ of a reverse yoke 3, the upper end being connected by the usual reach rod (not shown) for operation from the locomotive cab. Forming a part of the under side of the side bars 2 are bearings 4 to receive pins 5, one pin extending through each pair of bars, and each pin being held against movement by a small retaining pin 6. The pins 5 respectively provide bearings for the arms 3ᵃ of the reverse yoke 3. By virtue of this arrangement, an exceptionally strong construction is provided which may be readily assembled in an accurate manner. It is of particular importance in that trunnions which by their very nature are relatively weak and difficult to assemble in a structure of this character, are eliminated.

The reverse yoke is preferably formed in two parts, each arm 3ᵃ having a lateral extending portion 7 provided with a bore to receive a bolt 8. Spaced inwardly from each arm 3ᵃ and integral with the respective lateral portion 7 is a depending relatively short arm 8ᵃ. Disposed intermediate each arm 8ᵃ and adjacent arm 3ᵃ is one end of a radius bar 9, a pin 10 forming a bearing for each radius bar. This enables the radius bars to be readily mounted on the reverse yoke, provides a sturdy construction which not only eliminates the use of trunnions, but produces a more desirable construction.

The lower ends of the radius bars 9 are connected in the usual manner to a gear connecting rod 11 intermediate the ends thereof, and the upper end of the rod 11 is pivoted to one arm of a bell crank 12 which is pivoted to an upward extension 13 of the gear frame.

It is to be understood that the above is given by way of illustration and not of limitation, and changes in construction and arrangement may be made within the purview of the appended claims without departing from the spirit of the invention.

What I claim as new and desire to secure by Letters Patent is:

1. In a locomotive valve gear, a gear frame having pairs of laterally spaced parallel side bars, a reverse yoke having vertically disposed arms, means pivotally connecting each arm to one pair of side bars, a pair of shorter arms integral with said reverse yoke, each shorter arm being spaced inwardly from one of said vertically disposed arms, a pair of radius bars, and means pivotally connecting each radius bar to an adjacent shorter and vertically disposed arm.

2. In a locomotive valve gear, a gear frame having pairs of laterally spaced parallel side bars, a two piece reverse yoke, each piece comprising a relatively long arm, a laterally extending portion, and a relatively short arm parallel to and inwardly spaced from said long arm, means for securely connecting said laterally extending portions, a pin pivotally connecting one end of each relatively long arm between a pair of said side bars, a radius bar interposed between each relatively short arm and the adjacent relatively long arm, and a pin pivotally connecting each radius bar to the adjacent long and short arms.

3. In a locomotive valve gear, a two part reverse yoke, each part comprising a relatively long arm having a bearing portion at one end, an integral laterally extending portion at the opposite end, a relatively short arm integral with said laterally extending portion spaced inwardly from and disposed parallel to said relatively long arm, said long and short arms having registering openings, and means for rigidly connecting the laterally extending portions of the two parts of the reverse yoke.

In testimony whereof I have hereunto signed my name to this specification.

JAY D. PURDY.